(No Model.) 2 Sheets—Sheet 1.
W. H. HART.
SECTIONAL DRAW ROD FOR PLACING ELECTRIC WIRES IN UNDERGROUND CONDUITS.
No. 373,289. Patented Nov. 15, 1887.
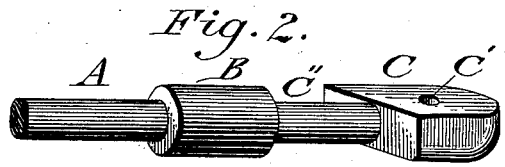
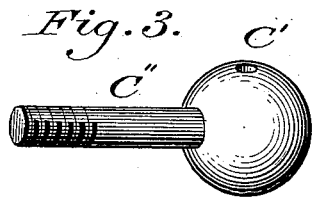
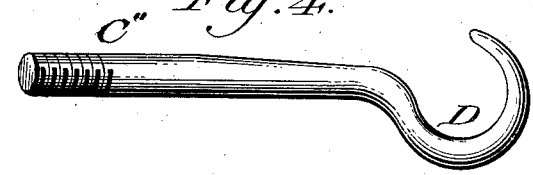
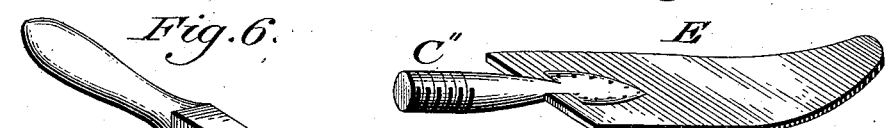
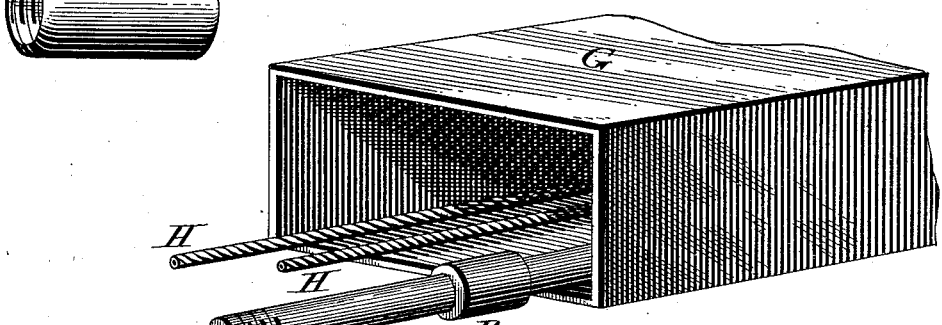
WITNESSES: INVENTOR (No Model.) 2 Sheets—Sheet 2.
W. H. HART.
SECTIONAL DRAW ROD FOR PLACING ELECTRIC WIRES IN UNDERGROUND CONDUITS.
No. 373,289. Patented Nov. 15, 1887.
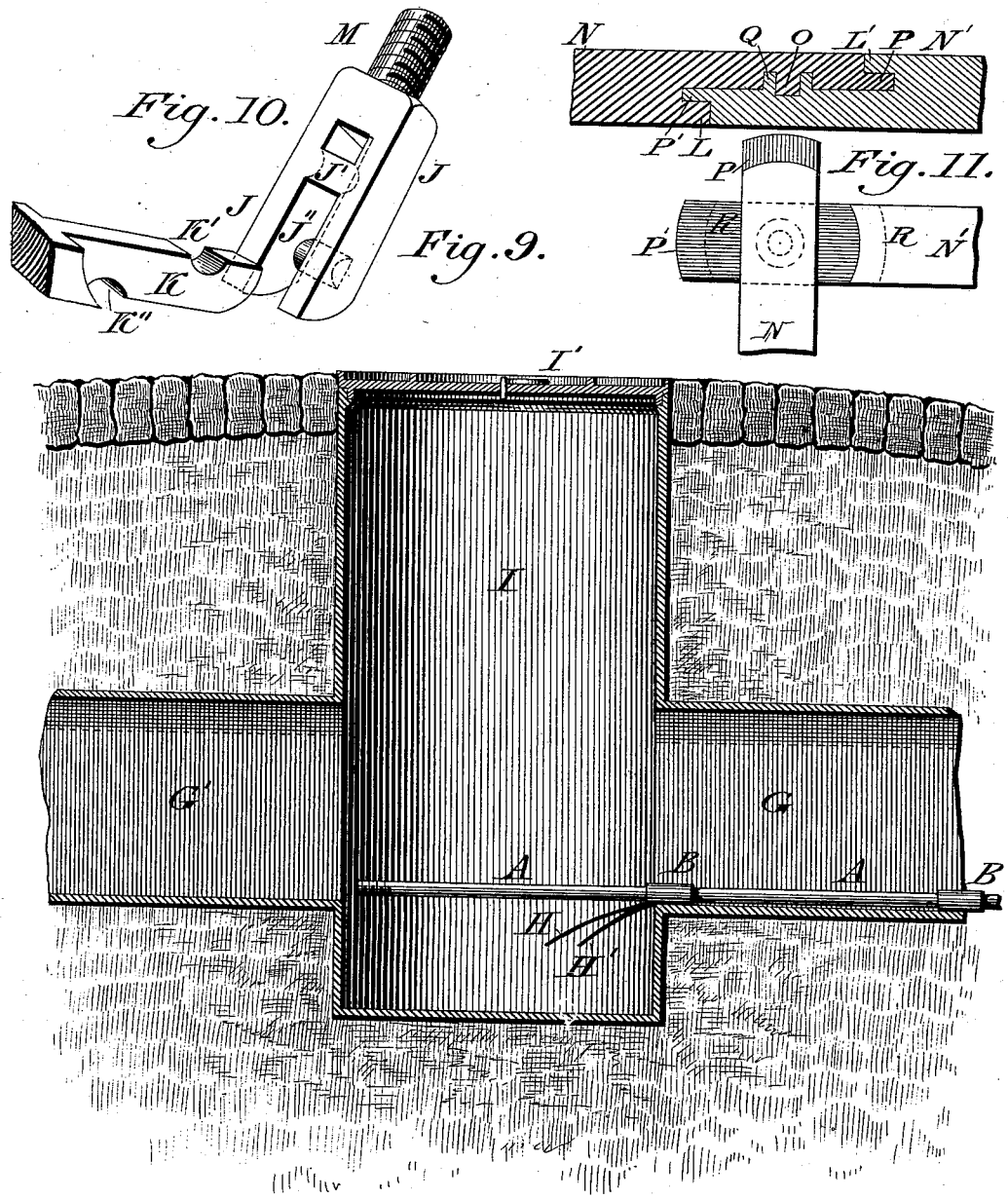
WITNESSES:
INVENTOR
William H. Hart
per George E. Buckley
his Atty.

UNITED STATES PATENT OFFICE.

WILLIAM H. HART, OF BROOKLYN, NEW YORK, ASSIGNOR TO WILLIAM H. JOHNSTONE, OF PHILADELPHIA, PENNSYLVANIA.

SECTIONAL DRAW-ROD FOR PLACING ELECTRIC WIRES IN UNDERGROUND CONDUITS.

SPECIFICATION forming part of Letters Patent No. 373,289, dated November 15, 1887.

Application filed October 4, 1886. Serial No. 215,215. (No model.)

*To all whom it may concern:*

Be it known that I, WILLIAM H. HART, a citizen of the United States, and a resident of Brooklyn, New York, have invented a new and Improved Sectional Draw Rod or Needle for Placing Electric Wires in Underground Conduits, of which the following is a full, clear, and exact description, reference being had to the annexed drawings, making part hereof.

It often becomes necessary in the general operation of electric underground systems in conduits to add wires to those already in place, and to do this cords or ropes have been employed. These ropes lie in the conduits from man-hole to man-hole, and as a wire is drawn in by one rope another rope is pulled in simultaneously therewith to take the place of the one withdrawn. Sometimes for a long period no occasion arises for the insertion of a new wire, and in the interim the rope will rot. It also happens sometimes that a comparatively fresh rope will break from inherent weakness in one part at a point too far from either mouth of the line of closed conduit to be reached by the operative, and as the wire cannot well be pushed through the broken rope is useless, and the only remedy left is to break one of the lines of wire at the two man-holes, thus throwing it temporarily out of service, and to use the separate section of wire to insert a fresh rope. This is inconvenient and detracts from the efficiency of the system. It is desirable at times to illuminate the interior of the conduit to search for defects in the same between the man-holes, and even to reach to points in the conduit too far from either man-hole to be accessible from the latter by ordinary means. The conduit has frequently to be broken into after digging up the superincumbent earth upon these occasions. My invention has for its object to remove these difficulties by providing a means whereby any part of the conduit may be reached at any time, and if necessary a new draw rope or cord inserted or threaded with ease and dispatch throughout a whole system of conduits.

The nature of my invention will fully appear from the following specification and claims.

In the drawings, in Sheet 1, Figure 1 is a side view of my jointed sectional rod or needle; Fig. 2, a perspective view of a broken end of the same provided with a pilot or guard at its forward end, showing a hole in the guard in which to secure a lamp, candle, or other luminant, or a rope or wire; Fig. 3, a similar view of a ball-guard, showing the screw-threaded shank by which all the forward attachments may be secured to the entering end of the sectional rod; Fig. 4, a similar view of a hook to be attached to the forward end of the rod to grasp or grapple with and draw out objects within the conduit; Fig. 5, a similar view of a spade-like attachment to serve as a guard or pilot, its bent-up end enabling it to pass freely over wires already laid and to sheer past side and bottom joints between sections of the conduit; Fig. 6, a similar view of a handle for the near end of the rod, whereby the latter may be turned over at will; Fig. 7, a broken-off perspective view of a section of conduit, showing the projecting end of a sectional rod laid therein and the ends of two electric wires; Fig. 8, a perspective view of the female screw-threaded sleeve to connect the sections of the rod.

In Sheet 2, Fig. 9 is a vertical longitudinal sectional view of a man-hole with the broken ends of two parts of the conduit, showing, also, part of the sectional rod and two ends of electric wires laid in said conduit. Figs. 10 and 11 are modifications of joints which may be used between the short sections of the rod.

My rod and its connections are made of iron, steel, or other suitable material or metal.

A A are sections of the rod, which may be solid, or made hollow like gas-pipe; B B, the short connecting-sleeves, provided with female screw-threads, which receive the male screw-threaded ends B' of sections A. Each section A is provided at one end with a sleeve, B, and at the other is screw-threaded, as at B', whereby any one section of the rod can at once and without delay be joined to any other section of the same.

C is a guard or pilot, rounded at its forward end and on its lower edges, and provided with a shank, C'', which screws into the sleeve B, being provided with a screw-thread for this purpose similar to shank C'' in Fig. 3; C', a hole, in which may be inserted a candle, or in which a lamp may be secured, to be carried by the guard. The ball shown in Fig. 3 may be hollow or solid, and is provided with a hole, C', and shank C'', having objects similar to like parts shown in Fig. 2. The part C'' in all the figures has the same object—viz., union with the forward end of the rod A.

D, Fig. 4, is a hook designed to be pushed forward into a conduit to grasp or grapple with a rope or other object and remove it from the interior of the conduit; E, a turned-up shovel-shaped pilot or guard, designed to travel freely over the wires in the conduit, and by its taper toward the outer end to sheer by the side joints of the latter; F, a handle, whose use has been above set forth; G, the broken-off end of an underground conduit for electric wires.

H H represent electric wires laid in conduit G.

I, Sheet 2, Fig. 9, is one form of man-hole in the line G G' of conduit, which latter opens into it.

I' is the cover.

Fig. 10 represents one form of joint between the sections. In this joint J J are two side bars, which receive between them the tongue K. Bars J J are secured by screw-shank M to the end of one section A of the rod, and tongue K by similar means is secured to one end of another section A, though not shown in the drawings, it being designed that each rod may be provided at one end with bars J J and at the other by a tongue, K. Tongue K is provided above, near its outer end, with a depression, K', and below, near its inner end, with a like depression, K''.

Bridging the space between bars J J, near the inner end of the space, is the connecting-piece J', and similarly bridging said space below, near the outer end of the space, is the connecting-piece J''. These connecting-pieces are adapted to fit snugly in the depressions, notches, or sockets K' K'', respectively. To make the joint, the tongue K is pushed at right angles (or nearly so) through the space between jaws J J and between pieces J' J'' until piece J'' is opposite to socket K'', into which it is drawn. The jaws J J', with piece J'' as a pivot in socket K'', are then straightened out in line with tongue K, when the piece J' will set in the socket K', and a stiff joint will be formed.

The sections A A of the rod are in practice made so much longer than the height of the space within the conduit that when this joint is used the end of any section cannot rise so high as to disconnect these jaws J J from tongue K. This joint has the advantage that howsoever rusty it may become it will be a matter of no great difficulty to break the rust to start the joint.

In Fig. 11 a vertical longitudinal section of one form of joint is shown locked, also a plan view of the same open. In this figure N N' are two detachable interlocking blocks. Block N is provided with an overlapping lip, L, and block N' with a similar lip, L'. A pivotal knob, O, on the lower face of block N engages in a round cup-shaped projection, Q, on the upper face of block N', and tongue P' of block N' engages snugly in the space between lip L and the block N. Tongue P of block N similarly engages in the space beneath lip L' of block N'. The blocks behind these spaces occupied by the lips are curved, (see the dotted lines R R,) and the outer edges of the tongues P P' are correspondingly curved. The joint is made by crossing the two halves of the joint with the knob O, set in the socket or cup Q, then turning the two halves, with the knob O acting as a pivot, until the parts assume the position shown in the sectional view of Fig. 11. This joint can only be disconnected by a lateral bending of the sectional rods to a degree sufficient to free the tongues from the overlapping lips, and can only happen in the conduit where the latter is so wide as to allow the sections of the rod to become unjointed. Many forms of joints will readily suggest themselves to the mind of a skilled mechanic, and the form I use may therefore be substituted by others. These conduits being below ground, it becomes necessary to descend a man-hole or into some other comparatively circumscribed space to reach the level of the conduit, and, if the full length of the stiff rod were formed above ground it would be difficult if not impossible to get it into the conduit. I therefore construct my rod in short sections of a length about that of the width of an ordinary man-hole, whereby the short lengths may be handled and turned easily by the operative. If it is desired to insert a new draw-rope from one man-hole to another through the conduit, I first secure a guard, substantially as shown, to the forward end of one section A of the rod. I then push the end of the rod into the conduit. I then screw or otherwise joint another section A of rod to the near end of the sectional rod already inserted and push the two joined sections forward in the conduit. Another section A of rod is then screwed or otherwise jointed to the last and pushed forward, and this process is repeated until the forward end of the rod reaches the next man-hole, when, at a preconcerted signal from the operative there stationed, the operation ceases. The draw line or cord is then secured to the near end of the rod—that is, to the near end of the section A last attached—and the rod is then pulled through into or passed into the next section of closed conduit, thus pulling the draw line or cord into the conduit-section first occupied by the rod; or the rod may be disjointed section by section as it is drawn toward the man-hole with which connection is to be made and the sections A A stacked for future use. This will also draw the forward end of the line or cord to the last-named man-hole. If desired, the sectional joined rod may be allowed to remain intact in any section of conduit until necessity again arises for its use. This will also draw the forward end of the line or cord to the last-named man-hole. If desired, the sectional joined rod may be allowed to remain intact in any section of conduit until necessity again arises for its use. If the conduit between the next two man-holes is deficient in draw-rope, the whole united sectional rod may be carried or drawn forward without disjointing, carrying a draw line or rope with it into such conduit and on to the next. Thus the rod once formed may be pushed along from point to point, wherever it may be required, or it may be disjointed after use and transported to other points.

At street intersections, while there may be a continuous straight line of conduit crossing the line of the intersecting street, there is frequently an intersecting line of conduit on the line of the intersecting street, the intersecting lines opening into one common man-hole. One of my sectional rods may be lying in one line of conduit. If in such case it becomes necessary to provide the intersecting line with a draw-rope, the operative stations himself in this man-hole and draws the rod toward him, detaching the first section A. He will then affix his pilot or guard, as above described, to one end of the section A, start the rod in the intersecting conduit, then unscrew another section of the rod and attach it to the one thus started, and so continue unscrewing and screwing on the short sections until the rod is laid in the intersecting conduit, and the cord can thus be drawn in, as above described. This draw line or cord may of course be composed of rope, heavy cord or twine, electric or draw wire, metallic band, or other elongated tissue; and I will use in my claims the term "line" generically to comprehend and cover any elongated tissue which may be used to draw wires through a conduit.

The draw-line may be attached directly to the rear or near end of the rod, or a hook or ring may be attached to the near end of the rod by a shank, C″, or by other convenient means, and the draw-line may be thereto attached. The office of the rod is to draw in or locate in a conduit a line, and this line may be the electric wire to be used therein.

The pilot or guard C may be made of any desired length to suit the requirements of conduits in which it is to be used. If such conduits are provided with side, bottom, or top branches at intervals, the pilot-piece C should be long enough to bridge the entrances to such branches, and thus avoid the danger of abutting against these entrances. I also use this rod to set two lines or wires in two separate sections of conduit simultaneously in the manner following, viz: After the sectional rod is laid in one section of conduit from one man-hole to another and it is desired to lay a line in the section which it occupies and also in the section of conduit between the second and a third man-hole, a line is attached to the rear end of the rod at conduit No. 1, from which the rod was formed, and another line is attached in man-hole No. 2, to the forward end of the rod. The rod is then pushed across man-hole No. 2 into the conduit-section between man-holes Nos. 2 and 3, and thus carries with it a line into the last-named section, while its rear end trails a line or wire into the conduit-section between man-holes Nos. 1 and 2. Thus two lines are laid simultaneously in two separate conduit-sections.

The hook D (shown in Fig. 4) may be attached to draw a line or wire into the conduit by attaching it to the rear end thereof, as well as to remove obstacles from the interior of the conduit when it is attached to the forward end.

The rod may be used to carry a line or wire to a hand-hole or lateral opening at any point of the conduit.

From the above description it will be seen that a line or wire may be attached to the forward end of the rod and one at the rear end thereof at the same time.

The line must not be attached to the forward end of the rod before the whole length of the latter is complete, as in attaching the successive rod-sections the forward end of the rod is rolled and turned by the operator as the work progresses and the line would wrap and tangle about the rod, or if an electric wire the insulating-coating of the latter would be injured. It will thus be seen that it is impractical to push the line forward as the line is being formed in the conduit. It must be drawn through after the rod or after a line laid by the rod. When the rod is completed in one section of conduit, a line, in an emergency where dispatch is required, may be attached to its forward end and pushed into the next section; but the line must be drawn through after the rod in the first section of conduit in which the rod is formed, and it is advisable that it should be drawn through in each successive section of conduit, and not pushed.

What I claim as new is—

1. The method above described of threading a conduit for electric wires with a line, which consists in pushing the forward end of a short section, A, of stiff rod into the conduit from a man-hole sunk to the depth of such conduit, joining to the near end of such first rod a second short section, and pushing the two sections thus joined forward into the conduit, similarly attaching another short section of rod to the near end of the one last pushed in, and so on continuously until the forward end of the jointed rod is carried forward to the point desired, and attaching a line to the near end of the jointed rod, and drawing the same into the conduit by means of said rod, substantially as and for the purpose set forth.

2. The method of threading a conduit for electric wires with a line, which consists in attaching one end of such line to the rear end of a stiff rod and pushing such forward end of said rod into said conduit until it reaches the point to which it is desired to carry the forward end of the line, and then drawing the rod out of the conduit and drawing the attached line in, substantially as and for the purpose described.

3. The combination, with a stiff rod formed of sections A A, jointed one to another, of a forward piece, C, adapted to receive and hold a lamp or candle, the whole being adapted to be pushed forward in a conduit for electric wires, substantially as and for the purpose described.

4. In combination with a stiff rod formed of short sections jointed to each other and adapted to be pushed forward in a conduit for electric wires, a line attached to the rear end of said rod to thread the conduit, substantially as described.

5. In combination with a conduit for electric wires, the stiff rod described, formed of sections A A, jointed one to another, substantially as shown, and adapted to be pushed forward in the interior of a conduit for electric wires and the walls of a man-hole, I, each section A of such jointed rod being of a length short enough to be handled horizontally in the man-hole I, whereby the sections can be jointed one to another as the joined sections A A progress in the conduit, substantially as and for the purpose described.

6. The method above described of threading two sections of conduit simultaneously, each with a line between man-holes or their equivalents, which consists in jointing a sectional rod from the first man-hole until the forward end of said rod reaches the second man-hole, the rod lying in the intermediate conduit-section, then attaching a line to the forward end of said rod in the second man-hole and another line to the rear end of the same in the first man-hole, and then pushing the rod into a conduit-section between the second and a third man-hole, whereby a line is laid in the latter conduit-section and another is drawn into the conduit-section between the first and second man-holes simultaneously, substantially as described.

In witness whereof I have hereunto set my hand.

WILLIAM H. HART.

Witnesses:
 GEORGE E. BUCKLEY,
 WM. H. CARSON.